S. LASKEY.
Workmen's Blouses.
No. 151,140. Patented May 19, 1874.
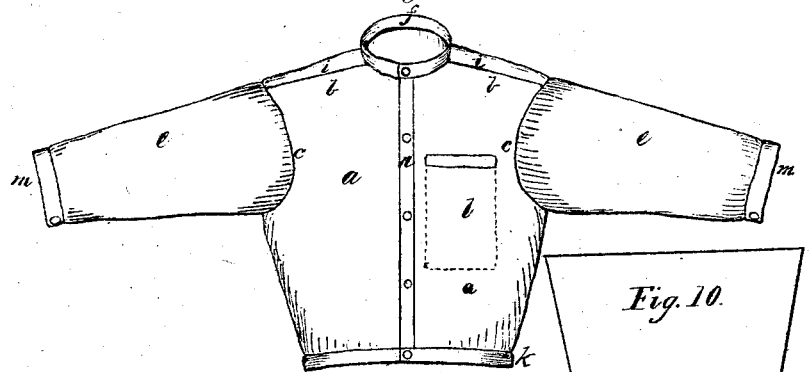
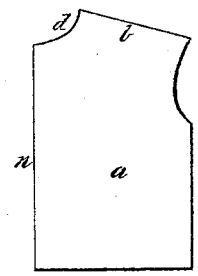
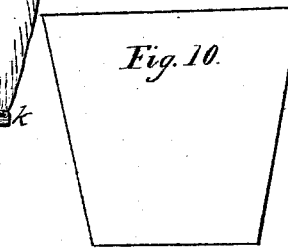
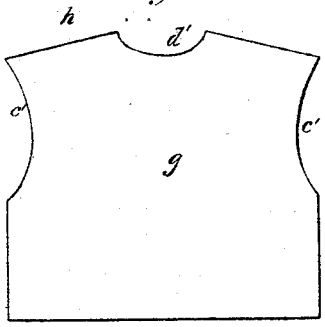
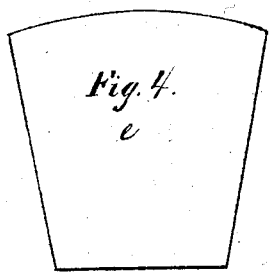
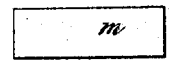
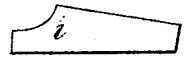
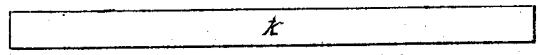
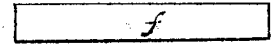
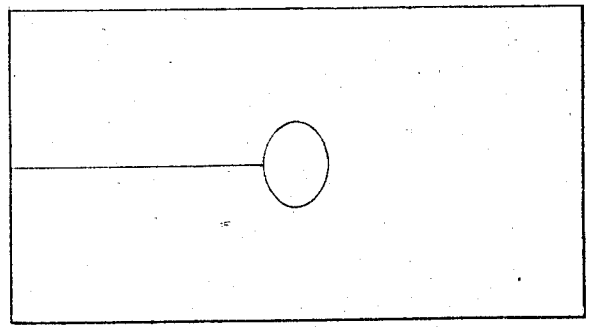
Witnesses:
D. G. Stuart
J. Y. Knight
Inventor
Stephen Laskey,
per P. Hannay
Attorney

UNITED STATES PATENT OFFICE.

STEPHEN LASKEY, OF BOSTON, MASSACHUSETTS.

IMPROVEMENT IN WORKMEN'S BLOUSES.

Specification forming part of Letters Patent No. 151,140, dated May 19, 1874; application filed March 4, 1874.

*To all whom it may concern:*

Be it known that I, STEPHEN LASKEY, of Boston, in the county of Suffolk and State of Massachusetts, have invented certain Improvements in Blouses or Jumpers, of which the following is a specification, reference being had to the accompanying drawings, in which—

Figure 1 represents a front view of my improved jumper or blouse; Fig. 2, a similar view of one of the front halves detached from the garment; Fig. 3, a similar view of the back, and Fig. 4 of the sleeve. Fig. 5 represents a view of one-half of the yoke, and Fig. 6 a similar view of the waistband; Fig. 7, the cuff, and Fig. 8 the collar. Fig. 9 represents a plan of the pattern of the front and back of the old style of cutting jumpers or blouses, and Fig. 10 a similar view of the old style of cutting the sleeve.

Heretofore the old style of "blouse" or "jumper" had the body—that is to say, the front and back—cut from the cloth in a single piece, having a hole cut at or near its middle for the neck, and a slit from the neck down the middle of the front to its lower end, and with straight seams on the sides, all as shown in Fig. 9, the sleeves being also cut with straight seams, as shown in Fig. 10. A blouse thus made fits the person badly, and is awkward and untidy.

My improved jumper, instead of being made with its body cut in one piece, is made in several parts, and with curved seams so cut as to conform to the natural shape of the person, thus giving ease and comfort to the wearer, and a strength and freedom of action unattainable by the old style of blouse. These parts consist of two front halves, *a*, (see Figs. 1 and 2,) each having its lower end and the lower end of its sides cut straight, while their upper end *b* is inclined upward from the shoulder to the neck to correspond with the natural inclination of the shoulders. Each of these halves is provided with a curved depression or seam, *c*, for the attachment of the sleeve *e* thereto, and with another depression, *d*, to which the neck-band or collar *f* is attached or secured. The edge of the sleeve *e*, where it is attached to the body of the blouse, is also curved to conform to the curvature of the seam edges *c* and *c'* of the fronts *a* and back *g*, as shown in Figs. 1, 3, and 4. The back *g*, Fig. 3, is cut in one piece, and with straight seams at the lower end of its sides, and, like the front halves *a*, is provided on each side with a curved depression for the reception and attachment of the curved end of the sleeves *e*, and is also provided at its upper end with a curved depression, *d'*, for the reception and attachment of the neck-band or collar *f*. The shoulder ends of the back, like the upper ends *b* of the front halves *a*, are also upwardly inclined from the shoulder to the neck-band, and are made of a length sufficient to lap over the shoulder, so as to be attached in front, along the line of seams *b* of the front halves *a a*, to the latter, and to the front edge or seam of the yoke *i*, the whole three being stitched together at one and the same operation. The other seams of the two half-yokes *i* are then stitched down to the back *g*, and their two ends stitched together at the back of the neck.

The yoke is represented as being cut in two halves, although, if desired, it may be cut in one piece; but, for some reasons, the former is deemed the better mode. The back, yoke, and fronts having been sewed together, and the edges *n* of the front halves *a* finished in the usual manner, as in Fig. 1, the neck-band *f*, sleeves *i*, and cuffs *m* are then sewed on, and a waistband, *k*, attached along the lower end of the garment. The blouse is then provided with buttons and button-holes down its open front edges *n*, for holding the garment together when put on for wear, as in the usual way. It may also be provided with one or two pockets, *l*, as may be desired. Each of the sleeves is provided with a cuff, *m*, as shown in Fig. 1.

Having thus described my invention, what I claim as new, and desire to secure by Letters Patent, is—

The new article of manufacture herein described, consisting of a jumper or blouse open in front, and formed of two half-fronts, *a a*, a back, *g*, yoke *i*, sleeves *e*, neck-band *f*, and waistband *k*, each being formed and cut, and all put together, in the manner and for the purposes set forth.

STEPHEN LASKEY.

Witnesses:
OLIVER STEVENS,
GEO. J. CROSSE,
WM. P. COOK.